United States Patent [19]

Nelson

[11] 3,918,638
[45] Nov. 11, 1975

[54] AUTO TRACK
[76] Inventor: Charles M. Nelson, 3029 Dupont Ave. South, Minneapolis, Minn. 55408
[22] Filed: Aug. 12, 1974
[21] Appl. No.: 496,555

[52] U.S. Cl. ................................. 238/14
[51] Int. Cl.² ........................ E01B 23/00
[58] Field of Search ...... 238/3, 14; 152/213 R, 221, 152/222; 188/32

[56] References Cited
UNITED STATES PATENTS

| | | | |
|---|---|---|---|
| 2,746,571 | 5/1956 | Taylor | 188/32 |
| 2,810,459 | 10/1957 | Nitz | 188/32 |
| 3,289,939 | 12/1966 | Martinov | 238/14 |
| 3,357,639 | 12/1967 | Peterson | 238/14 |
| 3,512,613 | 5/1970 | Peterson | 238/14 X |

Primary Examiner—M. Henson Wood, Jr.
Assistant Examiner—Randolph A. Reese
Attorney, Agent, or Firm—Schroeder Siegfried Ryan & Vidas

[57] ABSTRACT

My invention relates to a device for providing additional traction and grip for aiding an automobile which has been disabled by a rut or a slippery road surface or stuck in mud, sand or snow. The device provides a belt having a wedge-shaped appendage at one end so that, if the belt is pulled under the wheel, the spinning is reduced or stopped, and the wedge provides additional traction and lift to free the automobile.

5 Claims, 3 Drawing Figures

U.S. Patent  Nov. 11, 1975  3,918,638
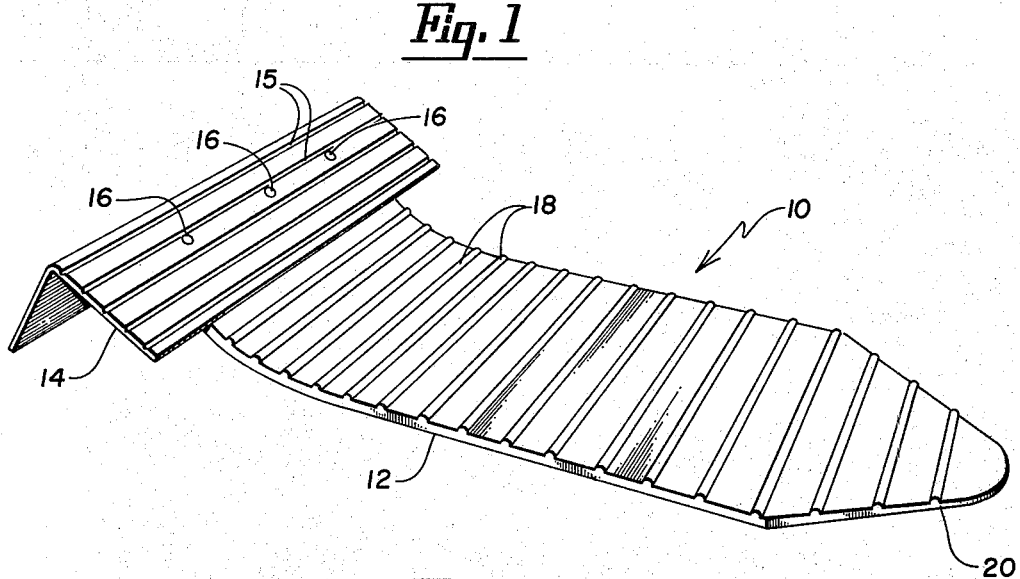
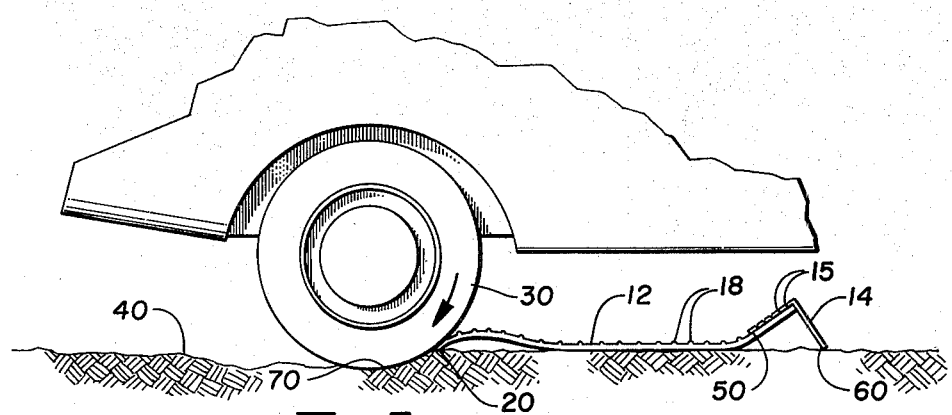
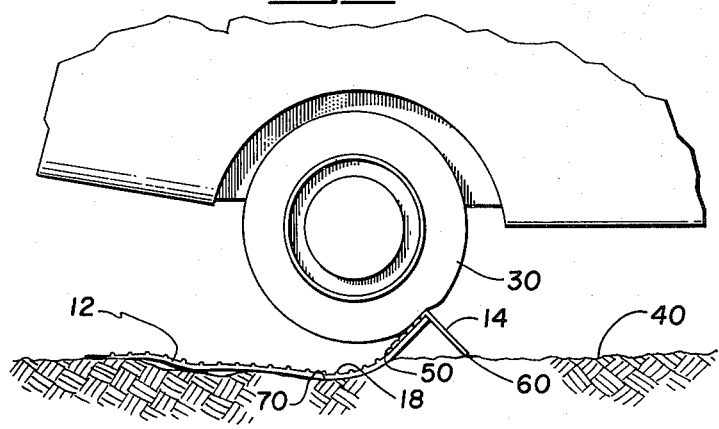

AUTO TRACK

A number of devices of various shapes and forms have been made and used for providing traction for automobile tires on slippery surfaces. Certain of such structures have been made in a mat-like configuration for insertion under a wheel to provide additional traction between a driving wheel, and a rut previously formed or created as a result of being stuck in mud, sand, or snow. A problem with such structures is that, although they provide increased traction between the wheel and the road surface, they tend, in many cases, to have better frictional contact with the tire than with the road surface, and the mat thereby tends to be rapidly pulled under the tire by the spinning action of the tire and consequently must be of a prohibitively long length to provide sufficient traction to free a stuck vehicle or must have complex means for avoiding relative motion between the mat and the road surface.

The present invention is directed to a simplified automobile traction-enhancing device which, when drawn under the tire by the spinning action of the tire against the mat on the ground surface, pulls an additional means under the tire which serves to provide increased traction as well as lifting the tire a short distance from the surface of the ground. This combination of lifting plus increased traction serves to readily free a stuck vehicle and is particularly helpful when the vehicle wheel is located in a hole or rut in the ground or road surface.

It is, therefore, the principal object of this invention to provide an improved vehicle traction-enhancing device.

Another object to this invention is to provide a vehicle traction-enhancing device which may be used to free a stuck vehicle from a rut in a minimum of time.

A further object of this invention is to provide a simplified structure of this type which is relatively low in cost and easy to use.

These and other objects of this invention will become apparent from a reading of the attached description together with the drawings wherein:

FIG. 1 is a perspective view of the improved traction-enhancing device.

FIG. 2 is a side view of the device as it is initially inserted under a vehicle tire.

FIG. 3 is a side view of the device after the entire device has been drawn underneath the automobile wheel.

Referring first to FIG. 1, there is illustrated the traction-enhancing device generally designated 10. The device is constructed from a belt portion 12 connected to a wedge-shaped appendage or an inclined plane portion 14 which is substantially wider than belt 12 which may readily be formed from a piece of angle iron having a right-angle bend and two equal length sides into which a number of transverse "V" shaped cuts 15 have been made by milling or some similar well-known process. The inclined plane portion 14 shown in FIG. 1 is connected to a flexible fabric or rubber belt 12 with rivets 16. Belt 12 has an upper surface which, because of the use of transverse ribs 18, provides a tire with a non-slippery surface. The bottom of belt 12 is left smooth so that the grip between the bottom surface of the belt and the ground is less than that between the top surface and the tire. Belt 12 is tapered at the end opposite from the inclined plane portion 14 to form a pointed tongue 20 for insertion under the tire of a stuck vehicle. Belt 12 is also tapered such that the pointed tongue portion is substantially thinner than the remainder of the belt to facilitate insertion under the tire.

The inclined plane portion 14 is attached to belt portion 12 such that, when the enhancing device 10 is disposed for use, the wedge 14 lies on the ground in an inverted "V" configuration.

FIG. 2 illustrates the friction-enhancing device in use in connection with a vehicle 20 which has a drive wheel 30. If the vehicle becomes disabled because drive wheel 30 spins freely against road surface 40 because of lack of traction between the drive wheel 30 and the road surface 40, the traction-enhancing device 10 can be disposed for use to improve traction as illustrated in FIG. 2. The tongue portion 20 of the device 10 is inserted at the point of contact between the wheel 30 and the edge of the rut or hole 40 such that normal rotation of the wheel 30 would tend to advance the vehicle toward wedge 14 along the belt 12.

In some instances where the ground surface 40 has sufficient traction, the flexible belt 12 will remain stationary with respect to the road surface 40, and the vehicle 20 will begin, because of the improved traction for wheel 30, to move forward along belt 12 and over wedge 14 to a better wheel engaging surface.

In many instances, however, there is insufficient frictional contact between belt 12 and road surface 40 so that rotation of wheel 30, while it is in contact with the ribbed, high traction top surface of belt 12, results in the automobile 20 remaining stationary and belt 12 being caused to move relative to said road surface 40 in a direction opposite to the desired direction of travel of the automobile. In many of the prior art friction-enhancing devices, this undesirable characteristic resulted in the traction-enhancing device being pulled under the wheel and thrown clear without any forward movement of the car. On the other hand, the present enhancing device will have the wedge 14 pulled into contact with wheel 30 as shown in FIG. 3. The relatively good traction between belt 12 and wheel 30 results in the wedge 14 being drawn against wheel 30. Further translational movement of the belt 12 ceases when the device reaches the position indicated in FIG. 3 since wedge 14, which is wider than the belt and the rut which has been formed by wheel 30, acts as an anchor to prohibit further movement of belt 12. The good traction between the tire 30 and the upper surface of belt 12 then permits the car to move forward.

After the wheel has drawn wedge 14 into close contact, and the wheel 30 beings to roll up the inclined plane formed by wedge 14, the weight of the car forces the wedge edges 50 and 60 into close contact with the ground surface 40 so that there is no tendency for relative movement between wedge 14 and the road surface. Continued rotation of wheel 30 from the top of wedge 14 results in the tire 30 moving across wedge 14 and a relative translational movement of automobile 20 in the desired direction of travel. In many cases, the lifting of the automobile wheel 30 and the force generated as the wheel rolls down the far side of the wedge will generate sufficient forward momentum of the automobile 20 so that the translational movement of the automobile can be sustained and a surface having adequate traction characteristics can be reached. If it is not possible to maintain forward movement of the automobile after a first use of the device, its characteristics permit it to be easily reinserted, and the entire process can be repeated. Even under the most adverse circumstances, each application of the device should result in some forward movement of the automobile.

An additional advantage inherent to applicant's structure is that the anchoring effect of wedge 14 on belt 12 permits the wheel to climb out of the rut and then elevates the wheel as it passes over the wedge. The additional elevation of the wheel has been found to facilitate the sustained forward movement of the car as the wheel leaves the rut and tends to prevent the recurrence of slippage between the wheel and the road surface.

Various modifications can be made to increase the versatility of the device of my invention. For example, various types of materials and finishing techniques can be used for producing a belt 12 having desirable friction characteristics for optimally translating the rotational movement of the automobile tire 30 to relative translational movement of the automobile 20 along road surface 40. For example, various types of conveyor belting have been found to have a high traction top surface and a low traction bottom surface useful for belt 12. It is also clear that various configurations can be adopted for the wedge portion 14. The use of the right-angle bent angle iron was adopted for ease in construction. It is clear that other wedges could be formed from pieces of angle iron having a generally triangular cross-section or various other wedge configurations. It is also clear that the surface treatment of the face of inclined plane 14 can be altered to increase the frictional characteristics of the inclined plane 14 to allow the automobile to climb the inclined plane and develop the necessary traction to move away from the areas of road surface having insufficient traction to allow rotation of drive wheel 30 to move the vehicle along the road surface.

In considering this invention, it should be remembered that the present disclosure is illustrative only, and the scope of the invention should be determined be the appended claims.

What is claimed is:

1. Traction-enhancing apparatus for providing improved traction between a vehicle drive wheel and a wheel rut in a ground surface, comprising:
    a belt, a first end of which may be inserted between said drive wheel and said ground surface, to provide additional traction between said wheel and said ground surface; and
    wedge shaped means attached to a second end of said belt to provide both additional traction between said ground surface and said drive wheel and elevation of said drive wheel to lift it from the ground surface to a height which is substantially greater than the thickness of said belt when said belt is drawn under said drive wheel due to relative slippage between the ground surface side of said belt and said ground surface.

2. Apparatus of the class described in claim 1 wherein said means has a triangular cross-section which is drawn under said wheel by relative motion between said wheel and said traction-enhancing apparatus.

3. Apparatus of the class described in claim 1 wherein said first end of said belt is tapered to provide a tongue for insertion under said wheel prior to use of said traction-enhancing apparatus.

4. Apparatus of the class described in claim 1 wherein said means is a right-angle bracket connected to said second end of said belt and disposed for normal operation with the open end of said bracket facing said road surface.

5. A device useful for providing traction for a vehicle disabled by lack of traction between a drive wheel and a ground surface, said device comprising:
    a flexible sheet of material; and
    a wedge attached to one end of said flexible sheet such that insertion of the other end of said flexible sheet under a vehicle wheel causes relative translation of said flexible sheet with respect to said wheel and draws the wedge under said wheel to lift and provide traction for the wheel to permit the vehicle to move forward relative to said ground surface.

* * * * *